Dec. 9, 1930.	S. MARCUS ET AL	1,784,531
EYE SET FOR DOLLS AND LIKE TOYS
Filed Sept. 1, 1927	4 Sheets-Sheet 1
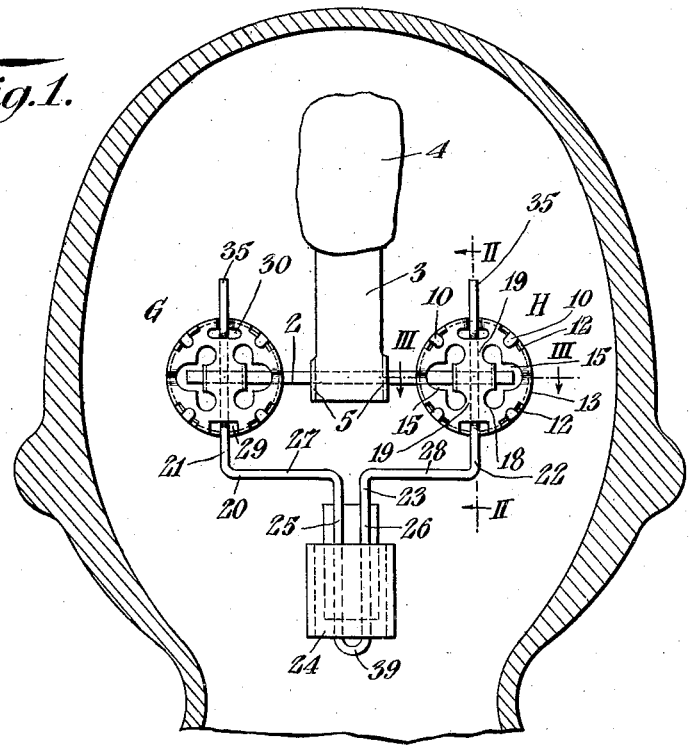
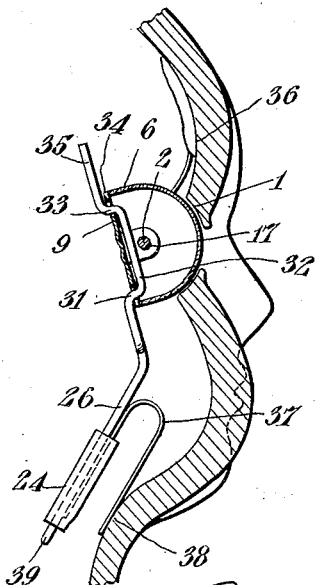

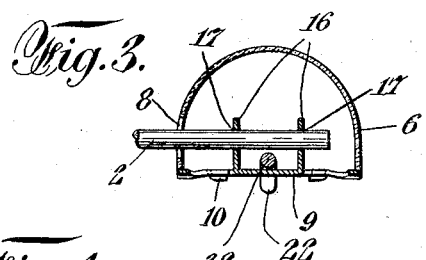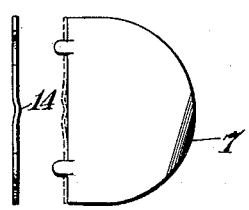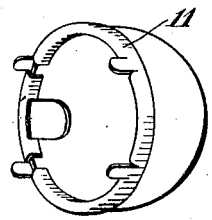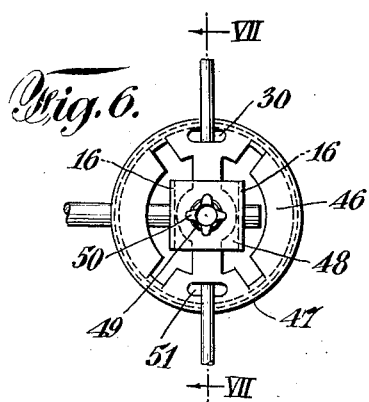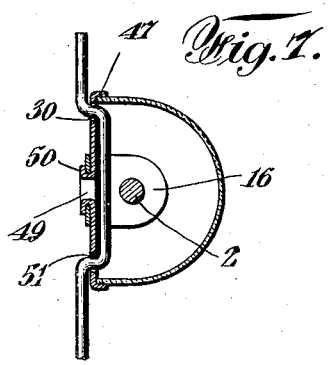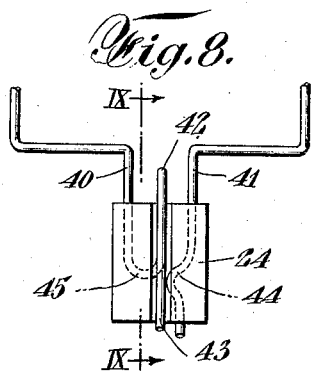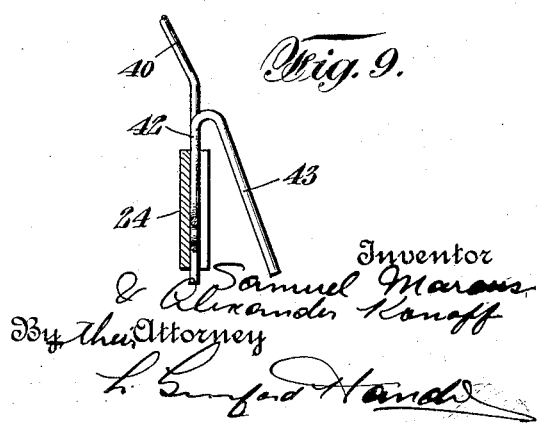

Dec. 9, 1930.  S. MARCUS ET AL  1,784,531
EYE SET FOR DOLLS AND LIKE TOYS
Filed Sept. 1, 1927  4 Sheets-Sheet 3
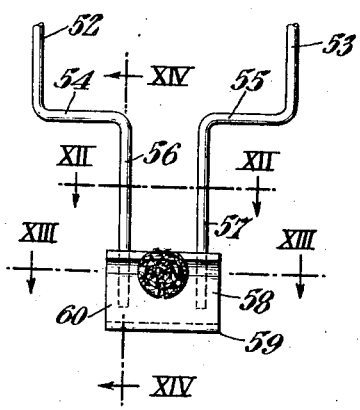
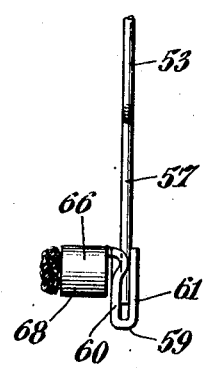
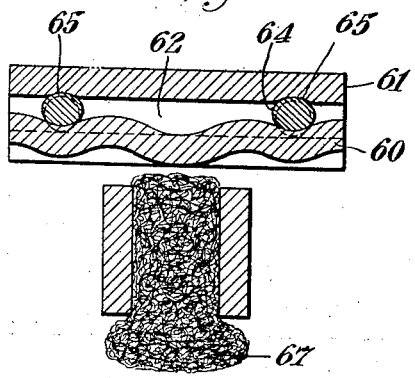
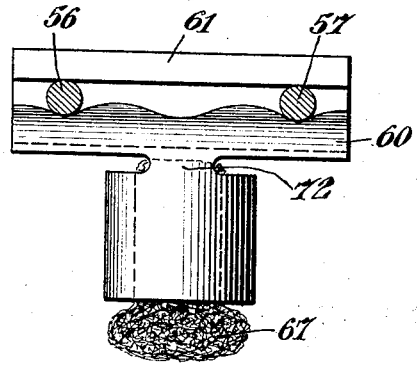
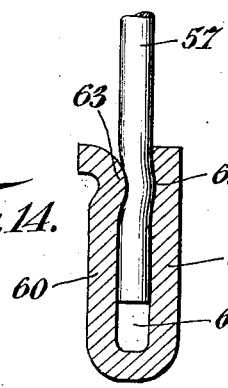
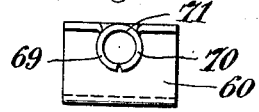

Dec. 9, 1930.    S. MARCUS ET AL    1,784,531
EYE SET FOR DOLLS AND LIKE TOYS
Filed Sept. 1, 1927    4 Sheets-Sheet 4

Patented Dec. 9, 1930

1,784,531

UNITED STATES PATENT OFFICE

SAMUEL MARCUS, OF BROOKLYN, AND ALEXANDER KONOFF, OF NEW YORK, N. Y., ASSIGNORS TO MARKON MFG. CO., INC., OF NEW YORK, N. Y., A CORPORATION OF NEW YORK

EYE SET FOR DOLLS AND LIKE TOYS

Application filed September 1, 1927. Serial No. 216,804.

This invention relates to an improvement in eye sets for dolls and like toys.

An object of the present invention is to provide improved and simplified means whereby the two eyes comprised in the set are substantially universally adjustable to facilitate their proper co-operative positioning within the eye sockets of the doll head while insuring their simultaneous movement to "open" and "closed" positions in response to changes of position of the doll head.

A further object is to provide improved means whereby the eyes will automatically adjust themselves within the eye sockets of the head during the act of attaching the set within the head.

A further object is to provide improved means by which the gravity weight element employed is attached to the eyes, whereby to insure simultaneous movement of the eyes to "open" and "closed" positions.

A further object is to improve the form and construction of the weight and resilient cushion elements employed.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which we have shown merely a preferred form of embodiment of the invention:—

Fig. 1 is a rear view of an eye set constructed in accordance with this invention and showing the same in position within a doll head, the head being illustrated in vertical section.

Fig. 2 is a vertical section taken upon the plane of line II—II of Fig. 1.

Fig. 3 is a horizontal section of one of the eyes and its supporting parts, the section being taken substantially upon the plane of line III—III of Fig. 1.

Fig. 4 is a side elevational view of the eye seen in Fig. 3, the back member of said eye being shown in full lines as detached and in dotted lines as attached.

Fig. 5 is a perspective view illustrating a modified form of the eye in which a separate re-inforcing ring is attached at the rear of the main hemispherical shell of the eye.

Fig. 6 is a rear elevational view of a modified form of eye structure including an improved pivot connection between the eye shell and its supporting cross rod.

Fig. 7 is a transverse sectional view taken upon the plane of line VII—VII of Fig. 6.

Fig. 8 is an elevational view of the gravity control element of the eye set, and illustrating a modified construction thereof.

Fig. 9 is a vertical sectional view taken upon the plane of line IX—IX of Fig. 8.

Fig. 10 is a view similar to Fig. 8 but illustrating a further modified construction.

Fig. 11 is an edge view of the structure Fig. 10.

Fig. 12 is an enlarged horizontal sectional view on the plane of line XII—XII of Fig. 10.

Fig. 13 is a similar sectional view taken upon the plane of line XIII—XIII of Fig. 10.

Fig. 14 is a similarly enlarged sectional view on the plane of line XIV—XIV of Fig. 10, and Fig. 15 is a front view of the weight detached and the felt bumper element employed being omitted.

Figure 16:
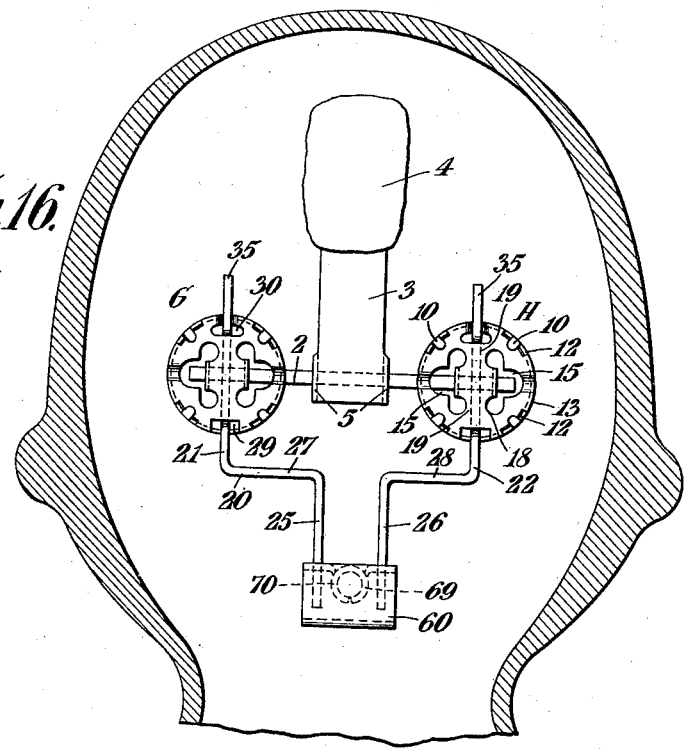
Figs. 16 and 17 show the bumper structure and weight arms of Figs. 10 to 15 as they appear in association with other features of the eye set.
Figure 17:
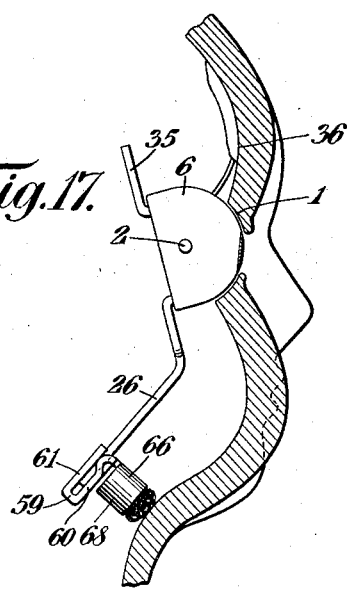

Referring to the drawings for describing in detail the structure illustrated therein, the reference character L indicates a doll head or the like, the same being hollow and having eye sockets as 1 therein spaced apart in the usual manner.

Interiorly of the head is arranged a horizontal cross rod 2 upon the opposite end portions of which the eyes G and H are carried.

The cross rod may be supported in any appropriate manner but in the instance illustrated is supported by means of a bracket member as 3 which is fixed by its upper end to the inner surface of the doll head as at 4 and which is provided with a bearing or bearings as 5—5 at its lower end within which the central portion of the cross rod is received.

The bracket member 3 may be resilient if desired or it may contain any of the well known features for urging the cross rod, and the eyes, forwardly so that the eyes will press yieldingly against the eye sockets of the head.

The eyes G and H may be formed of any appropriate material, such as celluloid, sheet metal, or otherwise. They consist essentially of hollow semispherical shells as 6 open at their rear sides and having an iris as 7 pictured in appropriate position upon the outer spherical surface. They are arranged upon the opposite end portions of the cross rod, each being provided with a side opening as 8 in appropriate position therethrough through which the cross rod extends into the interior of the shell. This opening is sufficiently larger in all directions than the diameter of the cross rod so that the shell will be free for adjustment about various axes as will be presently referred to and without undesirable interference from the cross rod.

At the rear of each of the shells is a back plate 9 formed separately from the shell and held in position upon and relative to the shell by any suitable means such as tangs 10—10 interengaging between the shell and the plate. In the instance illustrated the tangs are formed upon the shell, either integral with the material of the shell as in Figs. 1–4, or integral with a separate re-inforcing ring as 11 which may if desired be attached to the rear annular edge portion of the shell as in Fig. 5.

These tangs, prior to the attachment of the back plate, project rearwardly of the shell but after the plate has been placed in position said tangs are bent over upon and against the rear surface of the plate to bind the plate against subsequent accidental detachment.

The plate has suitable notches as 12—12 at its edge portion for receiving the tangs, and between these notches, circumferentially of the plate, a plurality of relatively extending portions as 13 occur said extending portions being designed to rest upon the rear annular edge surface of the eye shell, or of the re-inforcing ring 11, as the case may be. The tangs serve to hold the portions 13 against the rear surface of the shell but the notches 12 are formed wider than the width of the tangs in each instance so that the shell may be adjustably rotated upon a horizontal axis transverse to the length of the cross rod within the limits of the length of the notches, after the manner shown and described in patent of Alexander Konoff 1,580,051, April 6th, 1926. The shell, or iris carrying portion of each eye is thus independently adjustable upon a horizontal axis transverse to the length of the cross rod, and this adjustment is of importance since, as apparent from inspection of Fig. 4 the iris 7 is arranged below the horizontal centre of the spherical surface of the shell and its precise position in the finished doll can be altered to a nicety by the adjustment just referred to. Eye shells carrying eye lashes may be adjusted in this same manner to bring the eye lashes into proper register with the eye openings of the head.

One or more of the extending portions 13 is preferably bent to provide a slight protuberance as 14 at the forward surface of the plate in position for engaging the rear edge surface of the eye shell, and the adjacent portions of the plate are cut away as at 15 so as to render the portions 13 suitably resilient and springy to cause the protuberances 14 to rest with spring tension against the edge of the eye shell and thus assist in securing the shell and plate together. The spring pressure of the protuberances against the rear edge of the shell will of course continuously generate an opposing spring pressure of intervening portions of the plate against the forward surfaces of the tangs and adjustable movement of the shell relative to the plate will thus be rendered simple and easy while at the same time all possibility of loose motion between said parts entirely avoided.

Extending forwardly of each plate is a pair of lugs as 16—16, being formed in any suitable manner but preferably comprising at least portions of the metal of the plate struck out in formation of the openings 15—15. These lugs extend in substantially parallel relation to each other and are formed with aligned bearing apertures as 17—17 therethrough through which the cross rod engages, the size of the bearing apertures being such as to permit easy sliding movement of the eyes longitudinally along the cross rod for thereby enabling manual or automatically effected adjustment of the eyes toward and away from each other for properly registering with the eye openings of the doll head.

The fit of the bearings 17 upon the cross rod is also such as to enable an easy and desirable rotary movement of the eyes independently of each other rotatably of the cross rod so that the eyes are capable of being independently adjusted to directly elevate or depress the iris 7 thereof to bring the irises into correct register with the eye openings in the finished doll.

In forming the openings 15 heretofore referred to said openings are so designed that the central portion as 18 of the back plate, which carries the lugs 16, is connected with the remainder of the plate by relatively reduced neck parts 19—19 above and below the horizontal centre of the cross rod, said neck parts being of such proportions that while they are of ample strength to form a durable connection between the central portion of the remainder of the eye structure they are readily bendable, upon application of manual force, to thereby enable an adjustment of the eyes independently of each other upon vertical axes transverse to the length of the cross rod for bringing the irises 7 into positions giving a proper straight-ahead appearance to the eyes in the finished doll.

The connection between the eyes and the cross rod as thus described is seen to comprise a simple and durable arrangement whereby, without using a bendable cross rod, the eyes when being placed in position within the doll head will be free to automatically slide toward and away from each other along the length of the cross rod to enable the eyes to seat concentrically within the eye sockets of the doll head. Easy manual adjustment of the eye shells is also provided for at the same time rotatably of the cross rod and upon both vertical and horizontal axes transversely of the cross rod, the manual adjustment being thus substantially a universal one enabling the eye shells to be readily disposed for bringing the irises thereof into a desirable human-like register with the eye openings of the doll head. The inevitable inaccuracies in the shapes, proportions and placements of the doll head openings, and the inaccuracies which also occur in the placement of the irises upon different eye shells, are thus accounted for and a uniformly desirable result is readily secured.

In the adjustment of the eyes rotatably about the cross rod the fit of the cross rod within the bearings 17 does not produce sufficient friction to retain the eyes in their adjusted positions and on this account a bendable connecting, or operating, member as 20 is provided which in general is similar to the operating members shown and described in the pending applications of Alexander Konoff, Serial Nos. 161,915 and 189,611, in that it not only connects the eyes adjustably with respect to each other but also comprises a gravity control for the eyes and insures simultaneous gravity controlled rotary movement of the eyes in the completed doll. The detail construction of the connecting member, and the manner of attaching it to the eyes, in the present instance, differs from the arrangements shown in the pending applications essentially in that in the present instance the operating member utilizes the plates 9 for its adjustable connection with the eye shells, said plates, as already described having adjustable relationship with the shells, whereas in the pending applications the operating members have connection with the cross rod, the plates as 9 of the present structure not being present.

The connecting, or operating, member 20 is of Y-shape, including opposite legs as 21 and 22 which engage the eyes respectively. The stem portion as 23 carries a suitable weight as 24 by which the operating member is gravity controlled to produce rotation, or more correctly oscillation, of the eyes in response to movement of the doll head between upright and reclining positions, said movement being of course relative since it is in fact the doll head which moves while the eyes are maintained relatively stationary through the gravity pull of weight 24.

In the structure Figs. 1 and 2 the operating member consists of a single length of wire bent upon itself so that its mid-portion, constituting the stem 23 of the Y, provides two leads as 25 and 26 in relatively close proximity to each other while the end portions of the length of wire spread apart to provide aligned portions 27 and 28 substantially parallel with the length of the cross rod, and the legs 21 and 22 being turned upwardly in substantially parallel relation to each other and at right angles to the portions 27 and 28.

The back plate 9 of each eye is provided with a marginal notch 29 at its lower edge and with a slot 30 through the material thereof adjacent its upper edge. Both the notch and the slot are elongated transversely of the length of the legs 21 and 22, that is in a direction longitudinally of the cross rod.

The manner of attaching the legs 21 and 22 is identical for each eye, as follows:

At a suitable point above the horizontal portions 27—28, the leg is bent abruptly forwardly as at 31 to extend through the notch 29. It is then bent abruptly upwardly again providing a relatively off-set section as 32 extending upwardly along the inner surface of the plate. At the slot 30 the leg is again bent abruptly rearwardly through said slot as at 33 and thence abruptly upwardly again across the rear surface of a portion as 34 of the plate intervening between the slot and the upper periphery of the plate.

Above the slots 30 each leg continues upwardly to provide a pair of resilient bumpers as 35—35 arranged to engage against inner surface portions as 36 of the doll head to limit oscillatory movement of the eyes with respect to the head in closing direction.

The bumper portions 35 are adjustable, by bending, to form a properly timed engagement with the surface 36, and in effecting this adjustment the operator, while holding the eye in one hand, grips the bumper portion with the other and bends it forwardly or backwardly as occasion may demand, the point of bend occurring primarily within or adjacent the slot 30, this due to the diminished strength at this point on account of the original bending of the leg through the slot and the relatively fixed relationship of the leg to the plate in this locality. It is to be noted particularly that the slight bending of the bumper portion in effecting the desired adjustment thereof as just referred to will not materially alter the engaging fit of the leg with respect to the walls of the slot and adjacent parts of the plate. Considerable bending may be had without occasioning a detrimentally loose movement as between the leg and the plate at this point, and incidentally the strain imposed upon the eye structure during the act of bending the bumper portion is confined almost entirely to the plate itself due to the presence of the intervening portion 34 of the plate at one side of the bumper portion and the arrangement of the off-set section 32 at the inner surface of the plate. No appreciable tendency occurs for separating the plate from the eye shell during the adjustment.

By making the opening for passage of the leg at the bottom of the plate in the form of a notch through the edge of the plate a means is provided for enabling easy assembly of the parts since, with the leg fully bent to provide the off-set section 32, the upper end or bumper portion may be threaded through the slot 30 to bring the bent portion 33 within said slot, and the bent portion 31 within the notch 29 prior to attachment of the plate on to the eye shell, the act of attaching the plate on to the eye shell in this instance serving to close the open side of the notch and thereby positively retain the leg against displacement. Engagement of the bent portion 33 with the upper and lower walls of the slot in the assembled structure will prevent any appreciable loose up and down movement of the leg with respect to the eye, and the same result is also insured by engagement of the bent portion 31 with the edge of the eye shell and the upper edge of the notch 29.

With the two eyes thus assembled and held together by the connecting or operating member 20 they will necessarily oscillate together under the impulse of the weight 24. If it be required to adjust the eyes rotatably with respect to each other upon the cross rod, as heretofore mentioned, the operator while holding one eye relatively stationary may readily rotate the other thereby imposing a torsional strain upon the horizontal portions 27—28 of the operating member and thus causing said portions to be permanently twisted to a greater or less extent so as to hold the eyes in a newly adjusted position. Of if desired he may grip the stem portion 23 of the operating member with one hand and with the other apply pressure to either selected eye for twisting the portion 27 or 28 as the case may be. And it will be here noted that in applying pressure to one or the other of the eyes for twisting the portions 27—28 there will be little or no likelihood of bending the leg or legs at the points 31 within or adjacent to the notches 29 since obviously the same force will occur upon the portions 27—28 as upon the portions 31 and will much more readily distort the former than the latter.

The engaging fit between the legs and the eyes is by these means insured against detrimental disturbance and is readily therefore maintained in such relation as to permit of an easy sliding movement of the legs longitudinally of the slots and notches to the end that the automatic adjustment of the eyes within limits longitudinally of the cross rod will be facilitated while yet the eyes will be readily manually adjustable in all directions and be always constrained to oscillate in unison.

In some instances it may be desirable to adjust the legs 21—22 toward or away from each other, and this may be readily accomplished by simply bending the leads 25 and 26, or other portions of the operating member accordingly. Thus operating members of a given size may be easily altered to accommodate themselves to doll heads of different sizes.

The weight 24 may take any desired form but is preferably of the general type illustrated in the mentioned pending application Serial No. 189,611 in that it consists of a piece of metal of appropriate heft folded over upon itself so as to grip the leads 25 and 26 of the operating member between the folds. Held also between the folds is a strip of spring metal one end of which projects beyond the weight and is bent back upon itself to provide a spring arm 37 spaced sufficiently from the weight to constitute a resilient bumper for engaging an inner surface portion as 38 of the head to silently limit oscillatory movement of the eyes toward "opening" position.

The strip of spring metal comprising the bumper arm 37 is preferably sufficiently wide so that it overlies both of the leads 25 and 26 so as thus to be capable of properly engaging and binding against said leads, under pressure of the folds of the metal comprising the weight, irrespective of any adjusted positioning of the leads toward or away from each other as just above referred to, it being here pointed out that the metal comprising the weight is folded into clamped engagement with the bumper piece and with the leads preferably after the leads have been bent for disposing the legs 21 and 22 in desired spaced relationship, the bending movement being thus readily localized principally in the connecting portion as 39 between said leads, said portion being the part of the operating member which is furthest removed from the legs 21 and 22 and thus not occasioning any objectionable movement of the legs out of parallelism within the range of adjustment to which the legs are ordinarily subjected. When the operating member has been bent to produce the desired spaced adjustment of the legs 21 and 22 the metal comprising the weight is then folded tightly about the leads 25 and 26 and firmly clamps said leads against probability of accidental subsequent bending out of adjustment.

In the modification Figs. 8 and 9 it is suggested that the operating member be formed of two separate pieces of wire, as 40 and 41, instead of the single piece of the previous figures. It is also suggested that, in lieu of the separate strip of spring metal for forming the bumper 37, one of the pieces of wire, as the piece 40, may be looped back upon itself, as at 42, and be then bent forwardly to provide an integral spring arm 43 to serve the same purpose as the spring arm 37 of the previous figures. The remaining piece of wire as 41 is simply bent to provide a crook as 44 therein against which the metal of the weight 24 may clamp for securely holding the parts assembled. The bent portion 45 of the piece of wire 40 will serve the same purpose with respect to said wire 40.

The modification Figs. 6 and 7 suggests a construction by which adjustment of the eye shell upon a horizontal axis transverse to the cross rod is provided for without the necessity of employing the tangs and notch arrangement shown in Figs. 1 to 5. In this modification the back plate, here represented by the reference character 46, is made rigid with the eye shell in any approved manner as for instance by means of the flange 47 of the back plate tightly engaging the peripheral surface of the shell and being cemented, clamped, or otherwise held thereto.

The two lugs 16—16 for receiving the cross rod are in this case formed as parts of a separate U-shaped member as 48, the connecting portion of the U lying flat against the central portion of the back plate, either interiorly or exteriorly thereof, and the legs of the U, constituting the cross-rod-engaging-lugs 16 being projected forwardly in the same relation as in the previous figures. The connecting portion of the U is pivotally connected with the back plate by an appropriate pivot forming device, shown in the drawing as comprising portions of the plate bent through a central opening as 49 of the connecting portion of the U and being flared over upon said connecting portion as at 50. It is intended that the pivotal connection shall be such that while the eye shell may be adjustably rotated by the application of force nevertheless sufficient friction exists to prevent unintentional movement and to thereby hold the shell in any position to which it is adjustably forced.

Adjustment of the eye rotatably of the cross rod, as well as upon a vertical axis transverse of the cross rod, is provided for in the same manner as in the previous figures.

This modification also suggests the employment of a slot as 51 adjacent the lower edge of the back plate for accommodating the leg portion of the operating member in the same manner as described for the slot 30 at the upper edge of the eye in the present and in the previous figures, it being noted that the employment of two slots instead of one slot and one notch is optional as to all of the structures disclosed.

In the modification shown in the drawings Figs. 10 to 14 an operating member is suggested which consists of two separate pieces of wire as 52 and 53. These have their upper end portions disposed and connected with the eyes as heretofore explained with respect to the previous structures. Intermediate their length they are formed with the aligned portions 54 and 55, corresponding with the portions 27 and 28 referred to with respect to Figs. 1 to 8. Their lower portions are bent into substantial parallelism to provide the two leads 56 and 57, corresponding with the leads 40 and 41. In the present instance these two leads are normally perfectly straight.

At the lower ends of the leads 56 and 57 is arranged a weight as 58 consisting of a piece of metal of appropriate heft folded over upon itself and about the lower ends of the leads. The line of bend of said piece of metal is here in a horizontal plane beneath the lower ends of said leads as indicated at 59 so that the portions as 60 and 61 of said piece of metal at opposite sides of the line of bend extend upwardly one in front of and the other behind the end portions of the leads. This piece of metal thus provides a horizontally extending pocket as 62 into which the lower ends of the leads are received. The horizontal length of the pocket corresponds to the width of the piece of metal from which the weight is formed and since the pocket is normally of uniform size throughout its length the leads may extend thereinto at any desired point along the length of the pocket, that is to say the leads may be spaced apart more or less as may be desired according to the spacing apart of the eyes on the cross rod 2.

In attaching the weight on to the leads the leads are first placed a desired distance apart as may be determined by the desired spacing of the eyes, and then the portions 60 and 61 of the weight are clamped on to the leads so as to hold the leads permanently connected in their spaced relation and to at the same time fix the weight on to the leads, also to hold the leads against any undesirable turning or twisting movement with respect to each other.

By this arrangement it is possible for a manufacturer to assemble complete eye structures one upon each piece of wire, and store them away in quantities as stock material.

Then, when it is desired to fill an order for eye sets to match a given type of doll head the manufacturer can take two of these assembled structures, one right and one left, place them in a suitable jig to hold them the required distance apart as dictated by the particular type of head into which the eye set is to be fitted, and then clamp the weight on to the lower ends of the leads 56 and 57.

The weights can likewise be made up as standard stock material ready for being attached on to eye assemblies as indicated.

In attaching, or clamping, the weight on to the leads 56 and 57 the portions 60 and 61 may be simply pressed tightly against said leads, but in order to make the grip more positive and secure it is suggested that one or the other of the portions 60—61 shall be crimped against and about the leads in a manner to produce an effective distortion of the gripped portions of the leads and thus provide a positive grip for holding the leads against possible movement in all directions.

In the instance illustrated the weight with the leads in position within the pocket thereof is subjected to pressure by a suitable tool to cause the front portion as 60 of the weight to be crimped against and about the leads, the pressure being preferably suitably great to cause the normally straight and uniform leads to be themselves slightly distorted in cross section and bent out of a straight line, as clearly indicated in the drawings Figs. 13 and 14 wherein it will be seen that the pressure of the crimped part as 63 of the portion 60 against the leads has caused the underlying portions of the leads to be mashed into approximately an ovular cross sectional contour as indicated at 64 and to be bent out of a straight line and into a depression as at 65 created by the pressure in the underlying part of the portion 61 of the weight.

The mashing of the lead out of its normally circular cross section, and the embedding or bending of the mashed portion into the depression 65, all in the tight grip maintained between the parts 60 and 61, will prevent any possible rotary movement of the leads about an axis longitudinally of the leads or any possible longitudinal or other movement of the leads with respect to the weight. The leads may of course however be bent to effect adjustment of the eyes with respect to each other as hereinabove pointed out.

It is desired to note at this point that the vertical depth of the pocket 62, provided between the front and rear portions 60 and 61 of the weight, is such that the weight, prior to the operation of clamping it rigidly onto the leads, may be adjusted longitudinally of said leads within appreciable limits so that the weight in the completed eye set will stand at the most desirable distance from the cross rod, the distance being determined by the type of doll head to which the finished eye set is to be attached.

Provided at the forward side of the weight is a bumper element 66, and it is a feature of the present improvement to form this bumper as a piece of felt or other suitable material 67 held in position by a projecting part as 68 of the weight. In the instance illustrated the projection 68 is formed as an integral tubular extension of the front wall or portion 60 of the weight, the extension consisting of a pair of arms as 69 and 70 curved in a circular form to provide the socket as 71 within which the felt or the like as 67 is held. The arms 69 and 70 continue as lateral extensions of a portion as 72 by which the central portion of the arms is connected in integral continuation from the upper edge of the front wall or portion 60 of the weight.

The bumper element as thus formed is not only of a character to produce a practically silent engagement of the weight with the portion as 38 of the doll head in use, but it also adds such heft to the weight that the whole may be made of sheet metal which is of a sufficiently thin gage to facilitate the easy bending and forming of all of its parts as indicated from a single blank of sheet metal.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described our invention, what we claim as new and desire to secure by Letters Patent is:—

1. An eye set comprising a pair of eyes, a support for said eyes by means of which the eyes are oscillatable upon a common horizontal axis, a gravity controlled device for operating said eyes, the eyes each comprising a semispherical shell part and a rear wall part, the rear wall part having a pair of openings therethrough spaced away from each other, and said device having parts threaded through said openings free of the support for thereby connecting the device with the eyes, together with means for connecting the eyes with the support.

2. An eye set comprising a pair of eyes, a support for said eyes by means of which the eyes are oscillatable upon a common horizontal axis, a gravity controlled device for operating said eyes, the eyes each comprising a semispherical shell part and a rear wall part, the rear wall part having means by which it is connected with the support and having a pair of openings therethrough spaced away from each other, and said device having parts threaded through said openings free of the support for thereby connecting the device with the eyes.

3. An eye set comprising a pair of eyes, a support for said eyes by means of which the eyes are oscillatable upon a common horizontal axis, a gravity controlled device for operating said eyes, the eyes each comprising a semispherical shell part and a rear wall part, said parts being separately formed and connected together by means providing rotary adjustment of the shell part with respect to the rear wall part, the rear wall part having a portion bendable with respect to the remainder of said rear wall part providing attaching means by which the eye is connected with the support to thus provide adjustment of the eye rotatably upon an axis transversely of the support, and said rear wall part having means by which it is freely movably connected with said gravity controlled device.

4. An eye set comprising a pair of eyes, supporting means by which the eyes may be oscillatably supported within a doll head, and a gravity control device for said eyes comprising a weight made up of a piece of weighty sheet material folded over upon itself upon a substantially horizontal line of bend, a pair of separately formed members fixed to the eyes and extending downwardly to said weight, the opposite legs of the material forming the weight extending upwardly at the front and rear of said members and being clamped against said members to hold the weight fixed to said members, a resilient bumper element, and a portion of the material comprising the weight being bent to constitute a socket within which the bumper element is retained.

5. An eye set comprising a pair of eyes, supporting means by which the eyes may be oscillatably supported within a doll head, and a gravity control device for said eyes comprising a weight and connecting means between the weight and the eyes, said weight consisting of a piece of weighty sheet material folded over upon itself to provide opposite gripping jaws by which it is attached to said connecting means, a resilient bumper element, and a portion of the sheet material being bent to provide a socket within which the bumper element is retained.

6. An eye set comprising a pair of eyes, supporting means by which the eyes may be oscillatably supported within a doll head, and a gravity control device for said eyes comprising a weight and connecting means between the weight and the eyes, said weight consisting of a piece of weighty sheet material folded over upon itself to provide opposite gripping jaws by which it is attached to said connecting means, a resilient bumper element, and one of said gripping jaws having an extending portion bent laterally therefrom and shaped to provide a socket within which the bumper element is retained.

7. An eye set comprising a pair of eyes, supporting means by which the eyes may be oscillatably supported within a doll head, and a gravity control device for said eyes comprising a weight element and a pair of separately formed weight arms operatively connected with the eyes respectively and extending therefrom to the weight element, the weight element consisting of a piece of weighty sheet material folded over upon itself into U-shape disposed with the connecting portion of the U horizontally and with the opposite legs of the U extending substantially vertically upwardly from said connecting portion so that said weight element thereby provides an elongated horizontally extending upwardly opening seat to receive the weight arms, the portions of the weight arms adjacent the weight element being approximately vertical and in substantially parallel relation to each other and having their lower ends projecting into said seat at selected points in the length of the seat according to desired spacing of said weight arms, and the material of the weight element at opposite sides of the seat being bent into clamping engagement against the weight arms to hold the weight arms rigidly attached thereto.

8. An eye set comprising a pair of eyes, supporting means by which the eyes may be oscillatably supported within a doll head, and a gravity control device for said eyes comprising a weight element and a pair of separately formed weight arms operatively connected with the eyes respectively and extending therefrom to the weight element, the weight element having a horizontally extending upwardly opening seat therein, the portions of the weight arms adjacent the weight element being approximately vertical and in substantially parallel relation to each other and having their lower ends projecting into said seat at selected points in the length of the seat according to desired spacing of said weight arms, the material of the weight element at opposite sides of the seat being bent into clamping engagement against the weight arms to hold the weight arms rigidly attached thereto, a resilient bumper element, and the material of the weight element at one side of said seat being shaped to provide a laterally facing socket upon the weight element within which the bumper element is retained.

9. An eye set comprising a pair of eyes, a support for said eyes by means of which the eyes are oscillatable upon a common horizontal axis, a gravity controlled device for supporting said eyes, each of said eyes engaging the support and comprising a semispherical shell open at its rear side and having a back plate extending across said rear open side, the back plate of each eye having a pair of openings formed therethrough, and said gravity controlled device having a pair of arms formed as parts thereof extending through the openings of the back plates respectively free of the support for thereby connecting said gravity controlled device with the eyes for oscillating the eyes in unison.

10. An eye set comprising a pair of eyes, a support for said eyes by means of which the eyes are oscillatable upon a common horizontal axis, a gravity controlled device for operating said eyes, each of said eyes engaging the support and comprising a hollow semispherical shell open at its rear side and having a back plate extending across said rear open side, the back plate of each eye having a pair of openings formed therethrough, and said gravity controlled device having a pair of arms formed as parts thereof projecting to the eyes respectively, said arms respectively extending through one opening of the back plate of the adjacent eye and into the hollow of said eye and outwardly through the other opening of said back plate for thereby connecting said gravity controlled device with the eyes for oscillating the eyes in unison.

11. An eye set comprising a pair of eyes, a support for said eyes by means of which the eyes are oscillatable upon a common horizontal axis, a gravity controlled device for operating said eyes, each of said eyes engaging the support and comprising a hollow semispherical shell open at its rear side and having a back plate extending across said rear open side, the back plate of each eye having a pair of openings formed therethrough, and said gravity controlled device having a pair of arms formed as parts thereof projecting to the eyes respectively, said arms respectively extending through one opening of the back plate of the adjacent eye and into the hollow of said eye and outwardly through the other opening of said back plate for thereby connecting said gravity controlled device with the eyes for oscillating the eyes in unison, said arms being shaped to provide shoulder portions engaging the walls of the openings of the back plates effective thereby to prevent accidental disconnection of the gravity controlled device from the shells.

In testimony whereof we affix our signatures.

SAMUEL MARCUS.
ALEXANDER KONOFF.